United States Patent
Miller et al.

(12) 
(10) Patent No.: US 9,264,182 B2
(45) Date of Patent: *Feb. 16, 2016

(54) ITERATIVE RECEIVER LOOP

(75) Inventors: Mor Miller, Raanana (IL); Amit Steinberg, Adanim (IL); Daniel Wajcer, Beit Yehoshua (IL); Dan Peleg, Sde-Yizhak (IL); Guy Cohen, Herzlia (IL)

(73) Assignee: NOVELSAT LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,911

(22) Filed: Sep. 13, 2012

(65) Prior Publication Data

US 2014/0075258 A1    Mar. 13, 2014

(51) Int. Cl.
| | | |
|---|---|---|
| *H03M 13/00* | (2006.01) | |
| *H04L 1/00* | (2006.01) | |
| *H04L 27/26* | (2006.01) | |
| *H04L 27/00* | (2006.01) | |

(52) U.S. Cl.
CPC ............... *H04L 1/005* (2013.01); *H04L 1/0047* (2013.01); *H04L 1/0057* (2013.01); *H04L 27/2655* (2013.01); *H04L 2001/0093* (2013.01); *H04L 2027/0055* (2013.01); *H04L 2027/0067* (2013.01)

(58) Field of Classification Search
CPC ... H04L 1/0009; H04L 1/0057; H04L 1/0041; H04L 1/0071; H04L 2027/0067; H04L 2027/0055; H04L 27/2655; H04L 1/005; H04L 1/0047; H04L 2001/0093
USPC ......................................................... 714/774
See application file for complete search history.

(56) References Cited

U.S. PATENT DOCUMENTS

| | | |
|---|---|---|
| 6,829,308 B2 | 12/2004 | Eroz et al. |
| 6,963,622 B2 | 11/2005 | Eroz et al. |
| 7,020,829 B2 | 3/2006 | Eroz et al. |
| 7,191,378 B2 | 3/2007 | Eroz et al. |

(Continued)

FOREIGN PATENT DOCUMENTS

| | | |
|---|---|---|
| EP | 1385270 A2 | 1/2004 |
| EP | 1717959 A1 | 11/2006 |

(Continued)

OTHER PUBLICATIONS

U.S. Appl. No. 13/322,454 office action dated Jul. 25, 2013.

(Continued)

*Primary Examiner* — Albert Decady
*Assistant Examiner* — Kyle Vallecillo
(74) *Attorney, Agent, or Firm* — D. Kligler IP Services Ltd.

(57) ABSTRACT

A method includes receiving a signal, which carries data that is encoded with an Error Correction Code (ECC), and correcting the received signal with an adaptive receiver loop. Soft input metrics for the data are computed over the corrected signal. The ECC is decoded using a decoder, which estimates soft output metrics based on the soft input metrics, by operating the decoder in an alternating pattern of external iterations that update one or more of the soft input metrics based on one or more of the soft output metrics, and internal iterations that update the soft output metrics but not the soft input metrics. The adaptive receiver loop is adjusted in a schedule that is defined relative to the pattern of the external and the internal iterations of the decoder.

21 Claims, 3 Drawing Sheets

(56) References Cited

U.S. PATENT DOCUMENTS

| | | | |
|---|---|---|---|
| 7,203,887 | B2 | 4/2007 | Eroz et al. |
| 7,234,098 | B2 | 6/2007 | Eroz et al. |
| 7,237,174 | B2 | 6/2007 | Eroz et al. |
| 7,296,208 | B2 | 11/2007 | Sun et al. |
| 7,334,181 | B2 | 2/2008 | Eroz et al. |
| 7,369,633 | B2 | 5/2008 | Jiang et al. |
| 7,376,883 | B2 | 5/2008 | Eroz et al. |
| 7,398,455 | B2 | 7/2008 | Eroz et al. |
| 7,403,574 | B2 | 7/2008 | Chen et al. |
| 7,430,396 | B2 | 9/2008 | Sun et al. |
| 7,593,490 | B2 | 9/2009 | Alagha et al. |
| 7,907,641 | B2 | 3/2011 | Sun et al. |
| 8,036,289 | B2 | 10/2011 | Ryoo et al. |
| 8,213,553 | B2 * | 7/2012 | Zhou et al. ............ 375/346 |
| 8,312,354 | B1 | 11/2012 | Varnica et al. |
| 2004/0237019 | A1 | 11/2004 | Lin |
| 2005/0138520 | A1 | 6/2005 | Richardson |
| 2005/0166132 | A1 * | 7/2005 | Shen et al. ............ 714/801 |
| 2005/0190868 | A1 | 9/2005 | Khandekar et al. |
| 2005/0262424 | A1 | 11/2005 | Tran et al. |
| 2006/0031737 | A1 | 2/2006 | Chugg et al. |
| 2007/0096873 | A1 * | 5/2007 | Sadr ............ 340/5.61 |
| 2007/0124644 | A1 | 5/2007 | Shen et al. |
| 2007/0234184 | A1 * | 10/2007 | Richardson ............ 714/780 |
| 2008/0019336 | A1 * | 1/2008 | Charash ............ 370/338 |
| 2008/0260073 | A1 | 10/2008 | Jin et al. |
| 2008/0263425 | A1 | 10/2008 | Lakkis |
| 2008/0294960 | A1 | 11/2008 | Sharon et al. |
| 2009/0106637 | A1 | 4/2009 | Kim et al. |
| 2010/0272011 | A1 | 10/2010 | Palanki et al. |
| 2011/0072330 | A1 * | 3/2011 | Kolze ............ 714/758 |
| 2011/0113304 | A1 | 5/2011 | Heinrich et al. |
| 2012/0079341 | A1 | 3/2012 | Wajcer et al. |
| 2013/0046958 | A1 | 2/2013 | Zhang et al. |
| 2013/0111250 | A1 | 5/2013 | Yang et al. |

FOREIGN PATENT DOCUMENTS

| | | | |
|---|---|---|---|
| WO | 2007040893 | A2 | 4/2007 |
| WO | 2010138206 | A1 | 12/2010 |
| WO | WO 2010/136930 | A2 * | 12/2010 |

OTHER PUBLICATIONS

EP Patent Application # 10780132.6 European Search Report dated Sep. 4, 2013.

Jin et al., "Early stopping for LDPC decoding: Convergence of mean magnitude (CMM)", IEEE Communications Letters, vol. 10, No. 9, New Jersey, US, pp. 667-669, Sep. 1, 2006.

Schotsch et al.,"Graph-Based Turbo DeCodulation with LDPC Codes", IEEE Vehicular Technology Conference, pp. 772-776, May 11-14, 2008.

Shin et al.,"A stopping criterion for low-density parity-check codes", IEICE Transactions on Communications, vol. E91B, No. 4, Tokyo, Japan, pp. 1145-1148, Apr. 1, 2008.

International Application PCT/IB2010/052161 Search Report dated May 12, 2011.

ETSI EN 302 307, "Digital Video Broadcasting (DVB); Second generation framing structure, channel coding and modulation systems for Broadcasting, Interactive Services, News Gathering and other broadband satellite applications", V1.1.2, Jun. 2006.

DVB Document A122, "Frame structure channel coding and modulation for a second generation digital terrestrial television broadcasting system (DVB-T2)", Jun. 2008.

Richardson et al., "The Capacity of Low-Density Parity-Check Codes Under Message-Passing Decoding", IEEE Transactions on Information Theory, vol. 47, No. 2, pp. 599-618, Feb. 2001.

Hochwald et al., "Achieving near capacity on a multiple-antenna channel", IEEE Transactions on Communications, vol. 51, issue 3, pp. 389-399, Mar. 2003.

Pusane et al., "Multilevel coding/modulation using LDPC convolutional codes", Proceedings of the International Symposium on Information Theory and its Applications (ISITA), Parma, Italy, pp. 685-689, Oct. 10-13, 2004.

Nana et al., "Improved decoding of LDPC coded modulations", IEEE Communication Letters, vol. 10, No. 5, pp. 375-377, May 2006.

ETSI EN 302 769, "Digital Video Broadcasting (DVB); Frame structure channel coding and modulation for a second generation digital transmission system for cable systems (DVB-C2)", V1.1.1, Apr. 2010.

Lin et a., "Early detection of successful decoding for dual-diagonal block-based LDPC codes", Electronics Letters, vol. 44, No. 23, Nov. 6, 2008.

Berrou et al., "Near Shannon limit error-correcting coding and decoding:Turbo-Codes", Proceedings of the IEEE International Conference on Communication (ICC), vol. 2, pp. 1064-1070, Geneva, Switzerland, May 1993.

Noda et al., "Optimum Binary to Symbol Coding for 6PSK and Bit Error Rate Performance", Proceedings of the IEEE Wireless Communications and Networking Conference (WCNC), pp. 509-513, Mar. 2007.

Clevorn et al., "Iterative Demodulation for DVB-S2", 2005 IEEE 16th International Symposium on Personal, Indoor and Mobile Radio Communications, pp. 2576-2580, Sep. 11-14, 2005.

ETSI EN 302 755, "Digital Video Broadcasting (DVB); Frame structure channel coding and modulation for a second generation digital terrestrial television broadcasting system (DVB-T2)", V1.2.1, Oct. 2010.

Colavolpe et al., "Algorithms for Iterative Decoding in the Presence of Strong Phase Noise," IEEE Journal on Selected Areas in Communications, vol. 23, No. 9, pp. 1748-1757, Sep. 9, 2005.

Casini et al., "DVB-S2 Modem Algorithms Design and Performance over Typical Satellite Channels", International Journal on Satellite Communications and Networking, issue 22, pp. 281-318, year 2004.

Sun et al., "Frame Synchronization and Pilot Structure for Second Generation DVB via Satellites", International Journal of Satellite Communications and Networking, issue 22, pp. 319-339, year 2004.

Morello et al., "DVB-S2: The Second Generation Standard for Satellite Broad-band Services," Proceedings of the IEEE, vol. 94, No. 1, pp. 210-227, Jan. 2006.

ETSI TR 102 376, "Digital video broadcasting (DVB); User Guidelines for the Second Generation System for Broadcasting, Interactive Services, News Gathering and other Broad-band Satellite Applications (DVB-S2)", V1.1.1, Feb. 2005.

U.S. Appl. No. 13/322,454 Office Action dated Jan. 16, 2014.

U.S. Appl. No. 13/322,454 Office Action dated Jul. 31, 2014.

U.S. Appl. No. 13/322,454 Office Action dated Jul. 6, 2015.

* cited by examiner

ITERATIVE RECEIVER LOOP

FIELD OF THE INVENTION

The present invention relates generally to wireless communication, and particularly to adaptive loops in communication receivers.

BACKGROUND OF THE INVENTION

Various communication receivers process received signal using different kinds of adaptive loops, e.g., phase tracking loops, automatic frequency correction loops, timing recovery loops, automatic gain control, channel equalization loops and others.

For example, U.S. Pat. No. 7,593,490, whose disclosure is incorporated herein by reference, describes a joint synchronizer and decoder that implements two decision aided processes, which are referred to as "decision aided candidate selection" and "decision aided synchronization and decoding." Decision aided candidate selection may be used to select a carrier frequency offset by selecting among a number of candidates for this parameter based on an indication of decoding success. Decision aided synchronization and decoding may be used for phase tracking based on an indication of decoding success. Although these joint synchronizing and decoding techniques may be implemented together, they may also be implemented independently. The joint synchronizer and decoder may be implemented within a return channel receiver in a DVB-RCS system using turbo coding and quadrature phase shift key (QPSK) data modulation.

U.S. Pat. No. 8,036,289, whose disclosure is incorporated herein by reference, describes an iterative residual frequency and phase compensation apparatus for an OFDM system and a method thereof. The apparatus includes a first classifying unit for classifying symbol sequences by each subcarrier wave, a soft-decision calculating unit for calculating a soft-decision value of a data symbol using a soft-decision reliability obtained from iterative decoding performed by the iterative decoder, a classifying unit for classifying the soft-decision values by a carrier wave, a frequency estimating unit for estimating a residual frequency error of each carrier wave using the soft-decision value, a phase estimating unit for estimating an average residual phase error using the soft-decision value, a frequency and phase compensating unit for compensating frequencies and phases for input symbols of each carrier wave using the estimated frequency error and the estimated phase error, and a buffer for temporally storing the compensated symbols to provide it to the first classifying unit.

PCT International Publication WO 2010/138206, whose disclosure is incorporated herein by reference, describes methods for iterative timing recovery. The methods include processing an input signal using an FEC decoder, using some of the information from the FEC decoding process to estimate the phase of the symbol carrier, and correcting the phase for subsequent input signals. Another of the embodiments under the present principles provides for post-processing of the phase estimation prior to using the estimate for phase correction. Another embodiment is a post processor that comprises a filter, including a Kalman filter. Another embodiment includes using a priori information embedded in the input signal, such as a synchronization signal, to assist the phase estimation process.

SUMMARY OF THE INVENTION

An embodiment of the present invention that is described herein provides a method, which includes receiving a signal that carries data encoded with an Error Correction Code (ECC). The received signal is corrected with an adaptive receiver loop. Soft input metrics for the data are computed over the corrected signal. The ECC is decoded using a decoder, which estimates soft output metrics based on the soft input metrics, by operating the decoder in an alternating pattern of external iterations that update one or more of the soft input metrics based on one or more of the soft output metrics, and internal iterations that update the soft output metrics but not the soft input metrics. The adaptive receiver loop is adjusted in a schedule that is defined relative to the pattern of the external and the internal iterations of the decoder.

In some embodiments, adjusting the adaptive receiver loop includes adapting the receiver loop in response to at least part of the external iterations, and refraining from adapting the receiver loop in response to the internal iterations. In an embodiment, adjusting the adaptive receiver loop includes adapting the receiver loop in response to at least some of the internal iterations. In another embodiment, the schedule varies over time. In yet another embodiment, the method includes setting the schedule adaptively based on measurements obtained from the decoder.

In some embodiments, receiving the signal includes receiving a frame of symbols and buffering the received frame in a memory, and adjusting the receiver loop includes applying the receiver loop successively to the symbols of the buffered frame. In a disclosed embodiment, adjusting the receiver loop includes dividing the frame into at least first and second intervals, and adapting the receiver loop in the first interval separately from and concurrently with adapting the receiver loop in the second interval. The method may include compensating for a discontinuity in the adaptive receiver loop between the first and second intervals.

In an embodiment, the received frame includes a header, data symbols and one or more optional pilot symbols, and adjusting the receiver loop includes processing only the data symbols and not the header and the pilot symbols. In another embodiment, the received frame includes a header, data symbols and one or more pilot symbols, and adjusting the receiver loop includes processing the data symbols, the header and the pilot symbols.

In some embodiments, correcting the received signal and adjusting the receiver loop includes applying the receiver loop to an output of a preceding receiver loop that initially processes the received signal. In an embodiment, correcting the received signal with the adaptive receiver loop includes tracking a phase of the received signal using a phase tracking loop. In another embodiment, correcting the received signal with the adaptive receiver loop includes tracking a frequency of the received signal using a frequency tracking loop.

In yet another embodiment, correcting the received signal with the adaptive receiver loop includes adjusting a gain of the received signal using an Automatic Gain Control (AGC) loop. In another embodiment, correcting the received signal with the adaptive receiver loop includes tracking a timing of the received signal using a timing recovery loop. In still another embodiment, correcting the received signal with the adaptive receiver loop includes equalizing a response of a communication channel, over which the signal is received, using an adaptive equalizer.

There is additionally provided, in accordance with an embodiment of the present invention, apparatus including a front end and circuitry. The front end is configured to receive a signal that carries data encoded with an Error Correction Code (ECC). The circuitry is configured to correct the received signal with an adaptive receiver loop, to compute soft input metrics for the data over the corrected signal, to decode the ECC using a decoder, which estimates soft output metrics based on the soft input metrics, by operating the decoder in an alternating pattern of external iterations that update one or more of the soft input metrics based on one or more of the soft output metrics, and internal iterations that update the soft output metrics but not the soft input metrics, and to adjust the adaptive receiver loop in a schedule that is defined relative to the pattern of the external and the internal iterations of the decoder.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for demodulation and decoding of signals that carry data encoded with an Error Correction Code (ECC).

In some embodiments, a receiver comprises an iterative ECC decoder that operates on soft input metrics such as Log Likelihood Ratios (LLRs). The decoder is operated in an alternating pattern of internal and external iterations. The external iterations update the soft input metrics at the decoder input based on soft output metrics produced by the decoder. The internal iterations, on the other hand, estimate the soft output metrics based on a given set of soft input metrics but do not update the soft input metrics.

Additionally, the received signal is processed by an adaptive receiver loop, for example a phase tracking loop that recovers and tracks the carrier phase of the signal. In the disclosed embodiments, the adaptive loop is adjusted in accordance with a certain schedule relative to the pattern of internal and external iterations of the decoder. For example, the adaptive loop may be adjusted following each internal iteration, following each external iteration, or following a certain subset of the internal and/or external iterations in the pattern. The pattern of the internal and external decoder iterations, as well as the schedule of loop adaptations, may be fixed or variable according to some criteria.

Several examples of adaptive loop implementations, and adaptation schedules and criteria, are described herein. In some embodiments, phase tracking is performed from one symbol to the next in a given received frame hat is buffered in memory. In some embodiments, the frame is divided into multiple intervals and phase tracking is performed separately and concurrently over the different intervals.

As will be explained and demonstrated herein, the disclosed techniques enable the receiver to operate at extremely low Carrier-to-Noise Ratio (CNR) for a given constellation and with modest coding redundancy overhead or no coding redundancy at all. The disclosed techniques are also highly effective in preventing and correcting cycle-slip events in which the phase tracking process starts from or converges temporarily to local minima of an incorrect carrier phase. An event in which the phase tracking loop starts from an exceedingly large phase offset may happen, for example, if initial header and pilot-aided phase estimation is too high for the constellation in use.

The embodiments described herein refer mainly to satellite Digital Video Broadcasting (DVB) applications that use Low Density Parity Check (LDPC) codes. The disclosed techniques, however, can be used in a variety of applications and with various types of ECC.

System Description

Figure 1:
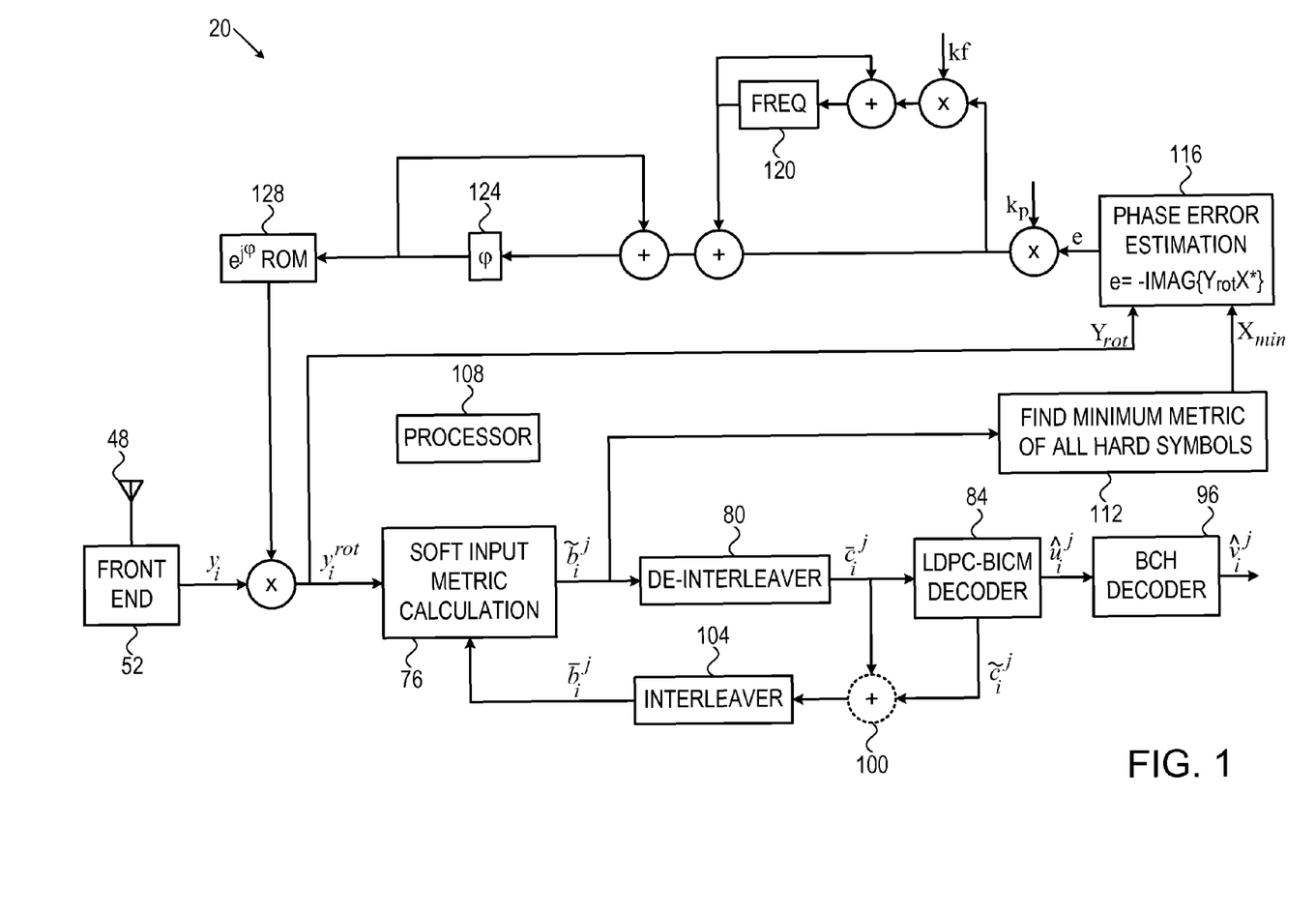
FIG. 1 is a block diagram that schematically illustrates a receiver that uses iterative demodulation and phase tracking, in accordance with an embodiment of the present invention.

FIG. 1 is a block diagram that schematically illustrates a receiver 20 that uses iterative demodulation and phase tracking, in accordance with an embodiment of the present invention. In the present example, receiver 20 receives signals from a satellite, in accordance with a Digital Video Broadcasting (DVB) protocol. Alternatively, however, receiver 20 can be used in any other suitable communication system operating in accordance with any other suitable standard or protocol.

Receiver 20 receives Radio Frequency (RF) signals that carry data. The signals have been encoded by a transmitter (not shown) with an Error Correction Code (ECC), and modulated with a digital modulation scheme that is defined by a symbol constellation. In the present example, the data is first encoded with a Bose-Chaudhuri-Hocquenghem (BCH) code and then with a Low Density Parity Check (LDPC) code, and the modulation scheme comprises Phase Shift Keying (e.g. QPSK or 8-PSK) or Amplitude-Phase Shift Keying (e.g. 16-APSK, 32-APSK, 64-APSK etc.).

The use of such ECC and modulation types in DVB systems is described, for example, in European Telecommunications Standards Institute (ETSI) standard EN 302 307 version 1.1.2, entitled "Digital Video Broadcasting (DVB); Second Generation Framing Structure, Channel Coding and Modulation Systems for Broadcasting, Interactive Services, News Gathering and Other Broadband Satellite Applications," June, 2006, and in DVB document A122, entitled "Frame Structure Channel Coding and Modulation for a Second Generation Digital Terrestrial Television Broadcasting System (DVB-T2)," June, 2008, which are incorporated herein by reference. Alternatively, however, any other suitable modulation and coding scheme can be used.

Receiver 20 comprises an antenna 48, which receives the RF signals from the satellite. A front-end 52 typically down-converts the RF signals to baseband, and applies functions such as low-noise amplification, filtering, gain control, digitization, down-sampling, frame synchronization, carrier frequency and phase estimation, and timing recovery, among others. As a specific example, front-end 52 may comprise legacy carrier, frequency and phase recovery loops, as suggested in DVB-S2 User guidelines TR 102 376 V1.1.1. The digital signal at the output of front end 52 comprises a sequence of received symbols denoted $y_i$. Signal $y_i$ is phase-rotated by a phase tracking loop that is described in detail below, to produce a phase-rotated sequence denoted $y_i^{rot}$. The phase tracking loop aims to track the carrier phase and carrier frequency of the received signal, so as to enable optimal demodulation and decoding.

The rotated signal $y_i^{rot}$ is demodulated and decoded by an iterative decoder that is described in the following paragraphs. Further aspects of such iterative decoders are addressed in U.S. Patent Application Publication 2012/0079341, entitled "Iterative decoding of LDPC codes with iteration scheduling," which is assigned to the assignee of the present patent application and whose disclosure is incorporated herein by reference.

In the embodiment of FIG. 1, a metric calculation unit 76 computes a respective soft metric $\tilde{b}_i^j$ for each bit j in each received symbol i. In some embodiments, the soft metrics comprise Log Likelihood Ratios (LLRs) of the received bits. Alternatively, unit 76 may compute any other suitable type of soft metric, which is indicative of the likelihood that the respective received bit corresponds to a certain transmitted bit. In some embodiments, unit 76 comprises an adaptive equalizer (e.g., a maximum likelihood sequence equalizer) that outputs the soft metrics. In alternative embodiments, unit 76 calculates the metrics but does not perform equalization.

A de-interleaver 80 de-interleaves metrics $\tilde{b}_i^j$ to produce de-interleaved metrics denoted $\bar{c}_i^j$. A Bit-Interleaved Coded Modulation LDPC (BICM-LDPC) decoder 84 decodes the LDPC code words by operating on metrics $\bar{c}_i^j$. Thus, metrics $\bar{c}_i^j$ are also referred to as soft input metrics or a-priori information. BICM-LDPC decoder 84 produces bit estimates denoted $\hat{u}_i^j$, which estimate the values of transmitted bits $u_i^j$ that were produced by the transmitter. In addition, BICM-LDPC decoder 84 produces soft output metrics denoted $\tilde{c}_i^j$ of the coded bits that were produced in the transmitter. Output metrics $\tilde{c}_i^j$ are also referred to as a-posteriori information.

Various types of BICM-LDPC decoders are known in the art. Some decoder configurations employ hard decisions, whereas other configurations use soft decisions. Some decoder configurations are iterative, whereas other configurations use a single decoding iteration. Some decoder configurations use message passing, whereas others may not. In some embodiments, BICM-LDPC decoder 84 uses a Belief-Propagation (BP) algorithm, also referred to as a Sum-Product Algorithm (SPA). An example configuration of a BICM-LDPC decoder is described by Richardson and Urbanke in "The Capacity of Low-Density Parity-Check Codes Under Message-Passing Decoding," IEEE Transactions on Information Theory, volume 47, number 2, February, 2001, pages 599-618, which is incorporated herein by reference.

BICM-LDPC decoder 84 can be implemented using any suitable decoder configuration that accepts soft inputs, and produces soft outputs that can serve as a-posteriori information. Typically although not necessarily, BICM-LDPC decoder 84 comprises multiple bit nodes that are connected to multiple check nodes by a set of arcs. The decoding process performs one or more iterations that pass information between the bit nodes and check nodes. In the present context, a non-iterative decoder is regarded herein as a decoder that carries iterations just between the bit nodes and the check nodes.

A BCH decoder 96 decodes the BCH code that decodes bit estimates $\hat{u}_i^j$, so as to produce estimates $\hat{v}_i^j$ of input data bits $v_i^j$ in the transmitter. Estimates $\hat{v}_i^j$ are provided as output.

In some embodiments, the soft output metrics $\tilde{c}_i^j$ (the a-posteriori information) are fed back and used to improve the input metrics $\bar{c}_i^j$ (the a-priori information). In the present example, an adder 100 subtracts respective output metrics $\tilde{c}_i^j$ from input metrics $\bar{v}_i^j$ of corresponding bits. The resulting metrics are interleaved by an interleaver 104, which reverses the operation of de-interleaver 80. The output of interleaver 104, denoted $\bar{b}_i^j$, is provided as extrinsic information to metric calculation unit 76. Unit 76 uses the extrinsic information $\bar{b}_i^j$ to adjust the soft input metrics $\tilde{b}_i^j$.

The process of modifying the soft input metrics based on the soft output metrics is referred to herein as an external iteration, in the sense that it is external to BICM-LDPC decoder 84. The external iterations are different and distinct from the internal decoding iterations performed inside BICM-LDPC decoder 84. In some embodiments, receiver 20 alternates between the internal and external iterations in an adaptive manner. In other words, the number of (one or more) internal iterations performed between any two external iterations can be modified adaptively.

In some embodiments, receiver 20 comprises a processor 108, which alternates between the internal and external iterations according to predefined conditions or criteria. Processor 108 controls BICM-LDPC decoder 84 and metric calculation unit 76 accordingly. In some embodiments, processor 108 controls the phase tracking loop described below.

The phase tracking loop operates on two inputs—the soft input metrics (e.g., LLRs) $\tilde{b}_i^j$ produced by metric calculation unit 76, and the phase-rotated symbols $y_i^{rot}$ at the input of unit 76. In the embodiment of FIG. 1, receiver 20 comprises a symbol estimation unit 112, which finds, for each rotated symbol $y_i^{rot}$, the hard constellation symbol $X_{min}$ with the highest probability given the received rotated symbol.

Typically, unit 112 finds $X_{min}$ by finding the constellation symbol having the maximum log likelihood based on the following formula:

$$X_{min} = argmax_k\{\log P(x_k \mid y_i^{rot})\} =$$

$$argmax_k\left\{\log(P(y_i^{rot} \mid x_k)) + \sum_j \log(P(x_k \mid b_i^j(x_k))P(b_i^j(x_k)))\right\}$$

wherein $P(b_i^j(x_k))$ is derived from the LLRs $\tilde{b}_i^j$ and j denotes the index of a specific bit within the $i^{th}$ symbol. Thus, unit 112 produces a sequence of hard symbols $X_{min}$ that are estimated using the soft input metrics $\tilde{b}_i^j$.

A phase error estimation unit 116 produces a sequence of phase error estimates denoted e. The phase error is computed once per each received symbol. As an example, the phase error may be given by:

$$e = -IMAG\{Y_{rot} \cdot X_{min}^*\}$$

The phase error is scaled by a phase scaling factor denoted $k_p$. In some embodiments, the scaled phase error is integrated by a second-order loop that tracks the carrier frequency offset relative to the receiver. In the example of FIG. 1, the second-order loop comprises a multiplier that multiplies the phase error by a frequency scaling factor denoted kf, and the result is then integrated using a frequency offset accumulator 120 whose output is fed back and added to its input. The second-order frequency tracking loop is sometimes referred to as an Automatic Frequency Control (AFC) loop.

In this embodiment, the output of the second-order frequency tracking loop is followed by a first-order phase tracking loop. The first order loop integrates the phase error using a phase accumulator 124 whose output is fed back and added to its input. (In alternative embodiments, the receiver performs only first-order phase tracking without second-order frequency tracking. In such embodiments, frequency offset accumulator 120 and its associated circuitry are omitted.)

The output of the phase tracking loop comprises digital values that estimate the carrier phase error, symbol by symbol. These digital values are used as indices to a Read Only Memory (ROM) 128 holding samples of the sinusoidal waveform $e^{j\Phi}$. The output of ROM 128 comprises a digital sinusoidal signal whose phase corresponds to the estimated phase error in the sequence of received symbols $y_i$. The output of ROM 128 is thus multiplied by $y_i$ to produce $y_i^{rot}$, i.e., to cancel the estimated phase error from the received signal.

The receiver configuration of FIG. 1 is an example configuration, which is chosen purely for the sake of conceptual clarity. In alternative embodiments, any other suitable configurations can also be used. For example, although the embodiments described herein refer mainly to LDPC codes, the disclosed technique can be used with any other suitable ECC that can be decoded using such an iterative decoding process. BCH decoder 96 may be omitted if no BCH code is used. Interleaver 104 and de-interleaver 80 may be omitted in some system configurations.

The elements of receiver 20 that carry out the iterative demodulation, decoding and phase tracking are referred to herein collectively as circuitry that carries out the disclosed techniques. In the example of FIG. 1, the circuitry comprises the various elements of receiver 20 with the exception of front end 52, decoder 84 and BCH decoder 96.

The elements of receiver 20 can be implemented using digital hardware, such as in one or more Application-Specific Integrated Circuits (ASICs) or Field-Programmable Gate Arrays (FPGAs). Alternatively, some elements of receiver 20 (e.g., processor 108) may be implemented is software, or using a combination of hardware and software elements.

In some embodiments, processor 108 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Operating the Phase Tracking Loop in Accordance with External Iterations of the BICM-LDPC Decoder As explained above, the iterative decoding process of the LDPC code in receiver 20 comprises a pattern of internal and external iterations of BICM-LDPC decoder 84. The external iterations update the soft input metrics at the input of decoder 84 based on the soft output metrics produced by the decoder. The internal iterations, in contrast, estimate the soft output metrics based on a given set of soft input metrics but do not update the soft input metrics. The pattern of the external and internal iterations may be fixed or adaptive, and may specify any desired number of internal iterations between successive external iterations.

In some embodiments, processor 108 applies the phase tracking loop in accordance with a certain schedule relative to the pattern of internal and external iterations of decoder 84. For example, processor 108 may invoke the phase tracking loop following each internal iteration, following each external iteration, or following only some of the internal and/or external iterations in accordance with some criterion. The criterion may depend, for example, on internal measurements in decoder 84, as discussed, for example, in in U.S. Patent Application Publication 2012/0079341, cited above.

As explained above and seen in FIG. 1, the input to the phase tracking loop is the soft input metrics $\tilde{b}_i^j$, which are based on the extrinsic information $\bar{b}_i^j$. In other words, the estimated hard symbols $X_{min}$, which are used by the phase tracking loop to estimate the phase error, are based on the soft output metrics $\tilde{c}_i^j$ produced by LDPC decoder 84. The estimated hard symbols $X_{min}$ are thus highly reliable, because they are derived from extrinsic information from the output of the LDPC decoder. This reliability makes the phase tracking loop of receiver 20 highly accurate.

In an example embodiment, processor 108 adapts the phase tracking loop in response to at least some of the external iterations of the LDPC decoding process. In other words, upon completion of an external iteration (although not necessarily every external iteration), the receiver re-estimates the carrier phase based on the soft input metrics that were updated by the external iteration. In these embodiments, processor 108 does not invoke the phase tracking loop following internal iterations, because they do not modify the soft input metrics.

In some embodiments, the phase tracking loop is invoked following only some of the external iterations, e.g., every second external iteration or based on any other suitable criterion. In these embodiments, since the phase tracking loop is invoked only when the soft input metrics are updated, and not necessarily upon every update, computational complexity can be reduced.

Figure 2:
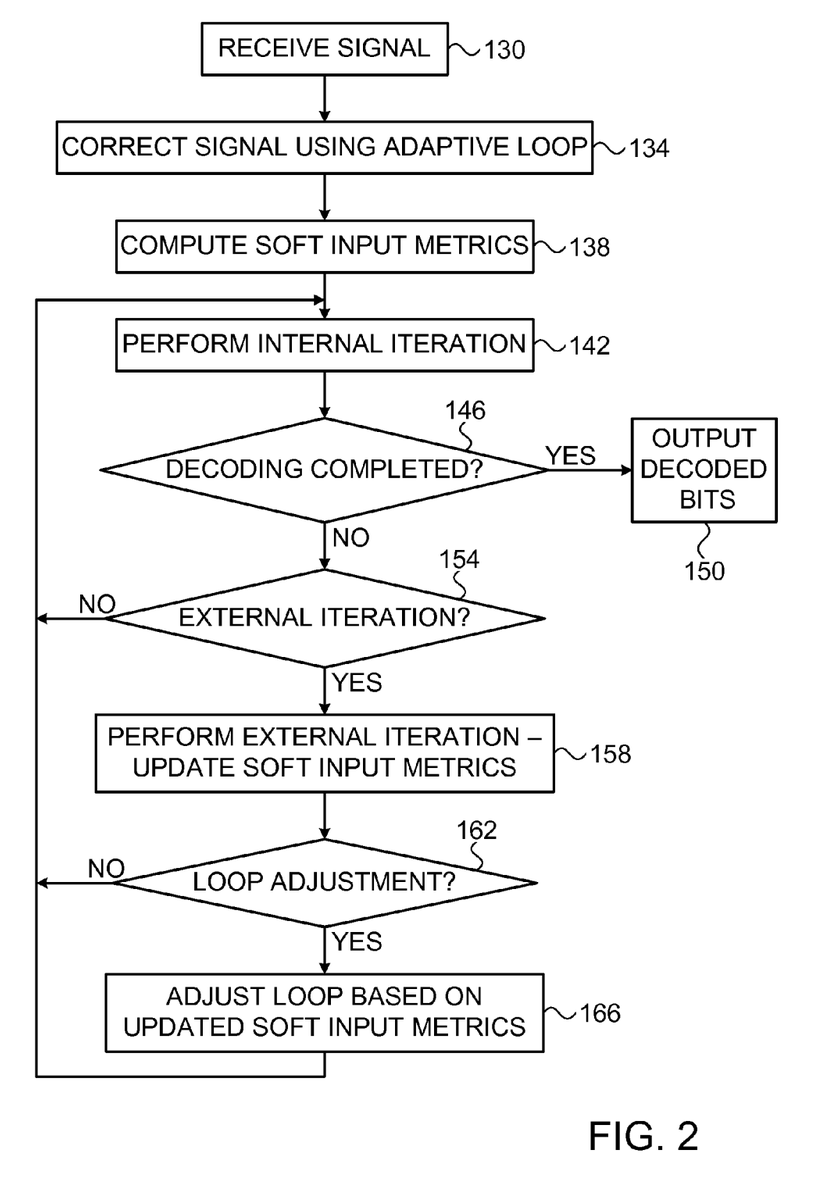
FIG. 2 is a flow chart that schematically illustrates a method for iterative demodulation and phase tracking, in accordance with an embodiment of the present invention.

FIG. 2 is a flow chart that schematically illustrates a method for iterative demodulation and phase tracking, in accordance with an embodiment of the present invention. The method begins with front end 52 of receiver 20 receiving and processing a satellite signal, at a reception step 130.

Processor 108 of receiver 20 corrects the carrier phase of the received signal using the adaptive phase tracking loop, (in the present example rotates $y_i$ to produce $y_i^{rot}$) at a phase correction step 134. Unit 76 computes soft input metrics $\tilde{b}_i^j$ based on $y_i^{rot}$, at a soft metric computation step 138.

Receiver 20 now begins the iterative LDPC decoding process, by carrying out a pattern of internal and external iterations of decoder 84. The receiver performs an internal iteration of decoder 84, at an internal iteration step 142. Processor 108 then checks whether decoding is completed successfully, at a completion checking step 146. If so, the receiver outputs the decoded bits, at an output step 150, and the method terminates.

Otherwise, processor 108 checks whether an external iteration is to be performed, at an external iteration checking step 154. The processor may use any suitable criterion for this purpose, e.g., count a predefined fixed number of internal iterations before each external iteration, or apply some adaptive criterion. Example criteria are described in U.S. Patent Application Publication 2012/0079341, cited above. As explained in this reference, the criterion may depend, for example, on internal measurements in decoder 84. If no external iteration is to be performed, the method loops back to step 142 above in which the receiver performs the next internal iteration.

Otherwise, processor 108 causes the receiver to perform an external iteration, at an external iteration step 158. The external iteration ends with the receiver updating the soft input metrics at the input of decoder 84.

Following the external iteration, processor 108 checks whether adjustment of the adaptive phase tracking loop is to be performed, at a loop checking step 162. As explained above, the receiver may adapt the phase tracking loop following every external iteration, or after a fixed or adaptive number of external iterations. If no loop adaptation is to be performed, the method loops back to step 142 above. If, on the other hand, the phase tracking loop is to be adapted, the receiver adjusts the loop based on the soft input metrics that were updated in the last external iteration, at a loop adjustment step 166.

The example of FIG. 2 illustrates an embodiment in which the phase tracking loop is adapted following some of the external iterations of decoder 84. In alternative embodiments, however, processor 108 of receiver 20 may invoke the phase tracking loop in accordance with any suitable schedule relative to the alternating pattern of internal and external iterations of decoder 84.

Intra-Frame Operation and Parallel Operation on Multiple Frame Segments

Typically, receiver 20 estimates and corrects the carrier phase from one symbol to the next within a given received frame. In these embodiments, receiver 20 receives a frame of symbols, stores the frame in a memory buffer (not shown in the figures), and estimates and tracks the carrier phase from one symbol to the next in the frame. In this mode of operation, the performance improvement gained by the accurate phase tracking is achieved in the present frame, not in the next frame. As such, this technique is especially suitable for highly dynamic communication channels whose response changes rapidly with time.

Each frame typically comprises a header, optionally pilot symbols and data intervals comprising data symbols. In some embodiments the phase tracking loop operates on all symbols including the header, pilot and data symbols. In these embodiments, the receiver typically takes into account the prior knowledge of the header and pilot symbols in order to improve tracking performance. In alternative embodiments the loop operates only on the data symbols.

In some embodiments, the receiver divides the frame into multiple intervals and applies the phase tracking loop separately to each interval. The receiver may estimate and track the carrier phase in the different intervals concurrently, advancing from one symbol to the next within each section. This mechanism is especially useful in real-time applications where the receiver is required to process each frame within a given latency constrain, e.g., before arrival of the next frame.

Figure 3:
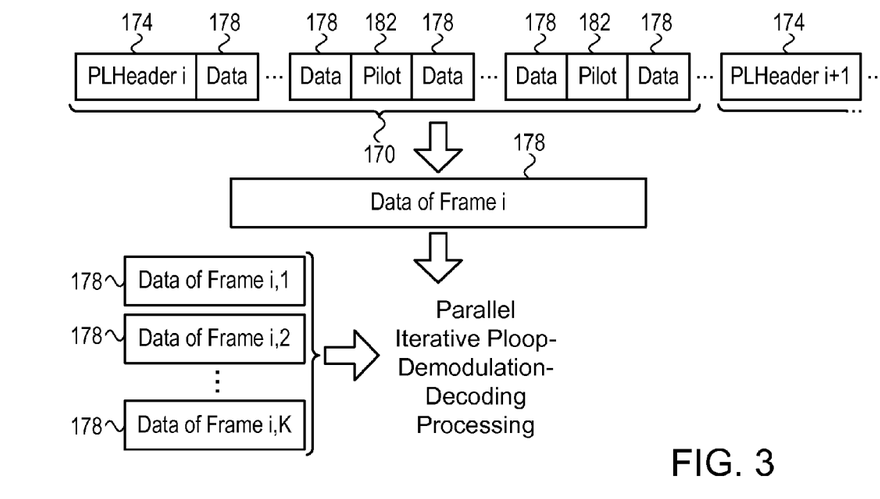
FIG. 3 is a diagram that schematically illustrates a scheme for parallel iterative demodulation and phase tracking, in accordance with an embodiment of the present invention.

FIG. 3 is a diagram that schematically illustrates a scheme for parallel iterative demodulation and phase tracking, in accordance with an embodiment of the present invention. In this embodiment, receiver 20 receives a sequence of frames 170. Each frame 170 comprises a header 174, followed by K multiple data intervals 178 separated by pilot symbols 182.

In the example shown in FIG. 3, processor 108 divides each frame 170 into the K individual data intervals 178, and applies the iterative phase tracking loop in parallel to the data intervals. The data intervals may or may not be of the same length.

Generally, however, the data intervals used for parallel phase tracking are not necessarily the same intervals that are separated by pilot symbols 182. As an example, a single data interval may be combined out of data symbols from both before and after a given pilot.

In an alternative embodiment, receiver 20 may track the carrier phase over only data intervals 178, but track the carrier frequency over header 174 and pilot symbols 182. For example, the receiver may advance phase offset accumulator 124 (FIG. 1) $L_p \cdot f$ times, wherein $L_p$ denotes the pilot length and f denotes the value of frequency offset accumulator 120.

When the phase tracking loop operates on the individual data intervals 178 of the frame, the recovered carrier phase may be discontinuous at the edges of these intervals. A discontinuity may also occur between successive frames.

Receiver 20 may handle phase discontinuities of this sort in various ways. In one embodiment, the receiver may disregard the phase discontinuities and allow the phase tracking loop to overcome them. In other embodiments, the receiver may mitigate a phase discontinuity between two successive data intervals by forcing the phase to be continuous.

Consider, for example, two successive data intervals 178 having a missing section between them due to segmentation or removal of pilot symbols. In an example embodiment, processor 108 may keep the phase at the beginning of the second interval unchanged, and add a linearly-incrementing phase along the first interval. The processor sets the slope of the linearly-incrementing phase so as to force the phase at the end of the first interval to be equal to the phase at the beginning of the second interval.

In an alternative embodiment, processor 108 may keep the phase at the end of the first interval unchanged, and add a linearly-incrementing phase along the second interval. The processor sets the slope of the linearly-incrementing phase so as to force the phase at the beginning of the second interval to be equal to the phase at the end of the first interval.

As yet another example, processor 108 may calculate the average between the phases at the end of the first interval and at the beginning of the second interval. The processor may then add a respective linearly-incrementing phase to each of the two intervals, such that the phase at the end of the first interval and the phase at the beginning of the second interval both reach the above-calculated average. Further alternatively, processor 108 may mitigate phase discontinuities between intervals in any other suitable way. The output of this process is an estimated phase function over the frame.

In some embodiments, the phase tracking loop of FIG. 1 above is applied to the output of a preceding phase tracking loop (e.g., as part of the front end 52). In other words, the sequence $y_i$ of the received symbols in FIG. 1 is already phase-corrected and frequency-corrected by the preceding loop. In an example embodiment, the preceding phase tracking loop operates on the header and/or pilot symbols of the frame, and the phase tracking loop of FIG. 1 operates on the data of the frame. In this manner, the two loops complement one another and are able to jointly achieve high accuracy and robustness. Alternatively, the phase tracking loop of FIG. 1 operates on the raw received symbols without prior phase or frequency correction.

Example Simulated Performance

The joint operation of iterative decoding and demodulation using decoder 84, and phase tracking using the disclosed phase tracking loop, enables receiver 20 to use a given symbol constellation with modest coding redundancy overhead or no coding redundancy at all and extremely low Carrier-to-Noise Ratio (CNR) for a given constellation and a given Bit Error Rate (BER) (e.g., BER=$10^{-10}$). Reducing the code redundancy for a given constellation means better spectral efficiency.

Figure 4:
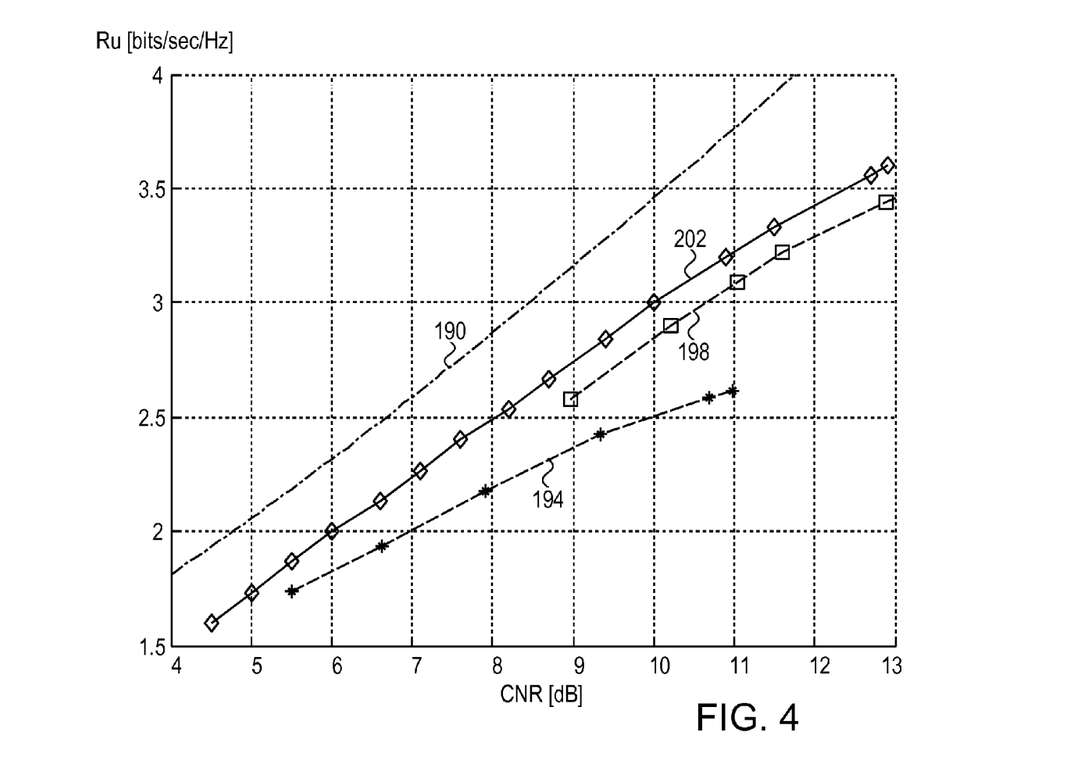
FIG. 4 is a graph showing performance of iterative demodulation and phase tracking, in accordance with an embodiment of the present invention.

FIG. 4 is a graph showing simulated performance of the disclosed iterative demodulation and phase tracking, in accordance with an embodiment of the present invention. The figure shows the spectral efficiency (denoted $R_u$) as a function of CNR for BER=$10^{-10}$. A plot 190 gives the theoretical Shannon limit on the spectral efficiency. A plot 194 gives the performance of DVB-S2 8-PSK modulation, and a plot 198 gives the performance of DVB-S2 16-APSK modulation. A plot 202 gives the performance of 16-APSK modulation with the disclosed iterative demodulation and decoding and iterative phase tracking. As can be seen in the figure, the disclosed techniques provide a considerable improvement in spectral efficiency.

The disclosed technique is also highly effective in preventing and correcting cycle-slip events. In a cycle-slip event, the temporary phase tracking error is larger than half the angular difference between adjacent constellation symbols. Because of this large phase tracking error, a legacy (non-decoder aided) phase tracking loop may become stuck at a local minimum that is mistakenly taken to be the correct carrier phase, resulting in a burst of demodulation errors. Cycle-slip events are especially likely when operating at a relatively low CNR for a given constellation. Since the disclosed techniques operate with high phase tracking accuracy at a relatively low CNR for a given constellation, they enable considerable reduction in the probability of cycle-slip events. At the operating point shown in FIG. 4, the probability of a frame with cycle-slip event is typically below $10^{-7}$.

Although the embodiments described herein refer mainly to phase and frequency estimation and tracking, the methods and systems described herein can be used in various other kinds of adaptive receiver loops. In other words, various other signal properties can be tracked and corrected by invoking an adaptive receiver loop in response to external iterations of iterative decoder 84. The adaptive loop may comprise, for example, a timing recovery loop that estimates and tracks the timing of the received signal, an Automatic Gain Control (AGC) loop that that estimates and tracks the gain of the received signal, an adaptive equalizer that estimates and tracks the channel response, and/or any other suitable loop.

Although the embodiments described herein mainly address satellite communication applications, the methods and systems described herein can be used in any other communication applications, as well as in non-communication applications (e.g., memory storage applications) that involve coding with a phase and/or frequency estimation or other tracking loops.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving symbols of a digitally modulated signal, which carries data that is encoded with an Error Correction Code (ECC);
correcting the symbols of the received signal with an adaptive receiver loop;
computing soft input metrics for the data of the corrected signal;
decoding the ECC using a decoder, which estimates soft output metrics based on the soft input metrics, by operating the decoder in an alternating pattern of external iterations that update one or more of the soft input metrics based on one or more of the soft output metrics, and internal iterations that update the soft output metrics but not the soft input metrics; and
adjusting the adaptive receiver loop, which corrects the symbols of the received signal, in a schedule that is defined relative to the pattern of the external and the internal iterations of the decoder.

2. The method according to claim 1, wherein adjusting the adaptive receiver loop comprises adapting the receiver loop, which corrects the symbols of the received signal, in response to at least part of the external iterations of the decoder, and refraining from adapting the receiver loop in response to the internal iterations of the decoder.

3. The method according to claim 1, wherein adjusting the adaptive receiver loop comprises adapting the receiver loop in response to at least some of the internal iterations.

4. The method according to claim 1, wherein the schedule of adjusting the adaptive receiver loop, which corrects the symbols of the received signal, varies over time.

5. The method according to claim 1, and comprising setting the schedule adaptively based on measurements obtained from the decoder.

6. The method according to claim 1, wherein receiving the signal comprises receiving a frame of symbols and buffering the received frame in a memory, and wherein adjusting the receiver loop comprises applying the receiver loop successively to the symbols of the buffered frame.

7. The method according to claim 6, wherein adjusting the receiver loop comprises dividing the frame into at least first and second intervals, and adapting the receiver loop in the first interval separately from and concurrently with adapting the receiver loop in the second interval.

8. The method according to claim 7, and comprising compensating for a discontinuity in the adaptive receiver loop between the first and second intervals.

9. The method according to claim 6, wherein the received frame comprises a header, data symbols and one or more optional pilot symbols, and wherein adjusting the receiver loop comprises processing only the data symbols and not the header and the pilot symbols.

10. The method according to claim 6, wherein the received frame comprises a header, data symbols and one or more pilot symbols, and wherein adjusting the receiver loop comprises processing the data symbols, the header and the pilot symbols.

11. The method according to claim 1, wherein correcting the received signal and adjusting the receiver loop comprises applying the receiver loop to an output of a preceding receiver loop that initially processes the received signal.

12. The method according to claim 1, wherein correcting the received signal with the adaptive receiver loop comprises tracking a phase of the received signal using a phase tracking loop.

13. The method according to claim 1, wherein correcting the received signal with the adaptive receiver loop comprises tracking a frequency of the received signal using a frequency tracking loop.

14. The method according to claim 1, wherein correcting the received signal with the adaptive receiver loop comprises adjusting a gain of the received signal using an Automatic Gain Control (AGC) loop.

15. The method according to claim 1, wherein correcting the received signal with the adaptive receiver loop comprises tracking a timing of the received signal using a timing recovery loop.

16. The method according to claim 1, wherein correcting the received signal with the adaptive receiver loop comprises equalizing a response of a communication channel, over which the signal is received, using an adaptive equalizer.

17. Apparatus, comprising:
a front end, which is configured to receive a digitally modulated signal that carries data encoded with an Error Correction Code (ECC) and provide symbols representing the received digitally modulated signal; and circuitry, which is configured to correct the symbols representing the received signal, provided by the front end, with an adaptive receiver loop, to compute soft input metrics for the data over the corrected signal, to decode the ECC using a decoder, which estimates soft output metrics based on the soft input metrics, by operating the decoder in an alternating pattern of external iterations that update one or more of the soft input metrics based on one or more of the soft output metrics, and internal iterations that update the soft output metrics but not the soft input metrics, and to adjust the adaptive receiver loop in a schedule that is defined relative to the pattern of the external and the internal iterations of the decoder, wherein correction of the received signal by the adaptive receiver loop precedes and is separate from decoding of the ECC by the decoder.

18. The apparatus according to claim 17, wherein the front end is configured to receive a frame of symbols, and wherein the circuitry is configured to buffer the received frame in a memory and to apply the receiver loop successively to the symbols of the buffered frame.

19. The apparatus according to claim 18, wherein the circuitry is configured to divide the frame into at least first and second intervals, and to adapt the receiver loop in the first interval separately from and concurrently with adapting the receiver loop in the second interval.

20. The apparatus according to claim 17, wherein the adaptive receiver loop comprises a phase tracking loop, and wherein the circuitry is configured to correct the signal by tracking a phase of the received signal.

21. The method according to claim 1, wherein correcting the symbols of the received signal with an adaptive receiver loop comprises estimating a carrier phase error based on the soft input metrics and rotating the symbols by a value selected responsively to the estimated carrier phase error and wherein adjusting the adaptive receiver loop comprises re-estimating the carrier phase error and updating the value used in rotating the symbols, responsively to the re-estimated carrier phase error.

* * * * *